United States Patent [19]

Burt, III

[11] Patent Number: 4,727,358

[45] Date of Patent: Feb. 23, 1988

[54] SUBSTITUTE WARNING DEVICE FOR AUTOMOBILE SEAT BELT REMINDER ALARM

[76] Inventor: Harry B. Burt, III, 4236 S. Pittsburg, Tulsa, Okla. 74135

[21] Appl. No.: 306,413

[22] Filed: Sep. 28, 1981

[51] Int. Cl.$^4$ .................................................. G08B 3/00
[52] U.S. Cl. .................................. 340/384 R; 84/95.2; 340/52 E; 340/328; 340/691
[58] Field of Search ................. 340/52 E, 691, 384 R, 340/328; 84/95 R, 95 C

[56] References Cited

U.S. PATENT DOCUMENTS

| | | | |
|---|---|---|---|
| 3,525,862 | 8/1970 | Carter et al. | 84/95 C |
| 4,232,287 | 11/1980 | Slavin et al. | 340/52 E |

Primary Examiner—David L. Trafton
Attorney, Agent, or Firm—Head & Johnson

[57] ABSTRACT

A plug-in type warning device to be substituting for the normal initially installed seat belt warning buzzer, or the like, in automobiles, the plug-in type warning device having a pleasant signal in the form of a musical signal, voice signal, or the like in lieu of the normal harsh buzzer sound.

3 Claims, 2 Drawing Figures

SUBSTITUTE WARNING DEVICE FOR AUTOMOBILE SEAT BELT REMINDER ALARM

BACKGROUND OF THE INVENTION

1. Field of the Invention

This invention relates to improvements in warning devices and more particularly but not by way of limitation to a warning device for unfastened automotive seat belts and the like.

2. Description of the Prior Art

Most automobiles today are equipped with warning buzzers and/or warning lights providing a signal or other indication when the seat belt is not secured upon ignition of the automobile engine. Similar warning devices are frequently provided for other safety features of the automobile to provide an alert in the event the feature is not activated properly or as a signal of some abnormal situation. Most of these warning devices comprise a relatively loud and harsh noise which most people find annoying. "Speaking" warning devices have been devised in lieu of the harsh and annoying buzzer warning systems, such as those shown in the Barton U.S. Pat. No. 3,870,818 and the Noji U.S. Pat. Nos. 3,879,704 and 3,909,842. The Barton patent is directed to a voice response device for indicating the presence of an unfastened seat belt or the like. The Noji U.S. Pat. No. 3,909,842 broadly relates to a warning signal for substantially any abnormal operating situation in the automobile and the Noji U.S. Pat. No. 3,879,704 is particularly interested in giving variable signals for indicating differing problems of the vehicle in order to avoid confusion in the signalling system. These devices have certain disadvantages however in that they are designed for original installation in the electrical system of the automobile or the like, and as a result, are of little value to the owner of a vehicle having the obnoxious buzzer system previously or initially installed therein.

SUMMARY OF THE INVENTION

The present invention contemplates a novel warning device for indicating an abnormal operating condition in an automobile such as an unfastened seat belt and which overcomes the foregoing disadvantages. The novel device is of a plug-in type which may be a standard "off-the-shelf" item and which may be used to replace the original equipment buzzer-type warning device normally installed in the vehicle. The initially installed warning device may be unplugged from the vehicle and may be replaced by plugging in the novel device of the invention in the position vacated by the initial buzzer. The novel warning device comprises an outer housing comparable to the size and configuration of a housing of the original or initial buzzer device and includes appropriate prongs for engagement with the socket wherein the original buzzer was connected. A miniature rotatable drum and complimentary musical tines such as usually found in a music box may be mounted within the housing in such a manner that the drum is rotated by a small electric motor. The electric motor is operably connected with prongs for being interposed in the electrical system of the vehicle in the same manner as the initial warning buzzer when the vehicle seat belt remains unfastened upon ignition of the vehicle engine, as is well known. When the small motor is energized the drum will be rotated for selectively striking the musical tines in the well known manner to produce a pleasing tune in lieu of the usual annoying warning buzzer sound. Of course, it may be desirable to substitute a speaking means in lieu of the musical drum and tines if desired and it may be desirable to utilize the novel warning device in lieu of substantially any originally installed warning buzzer for advising of conditions other than the unfastening of the seat belt. The novel plug-in warning device is simple and efficient in operation and economical and durable in construction.

DETAILED DESCRIPTION OF THE PREFERRED EMBODIMENT

Figure 1:
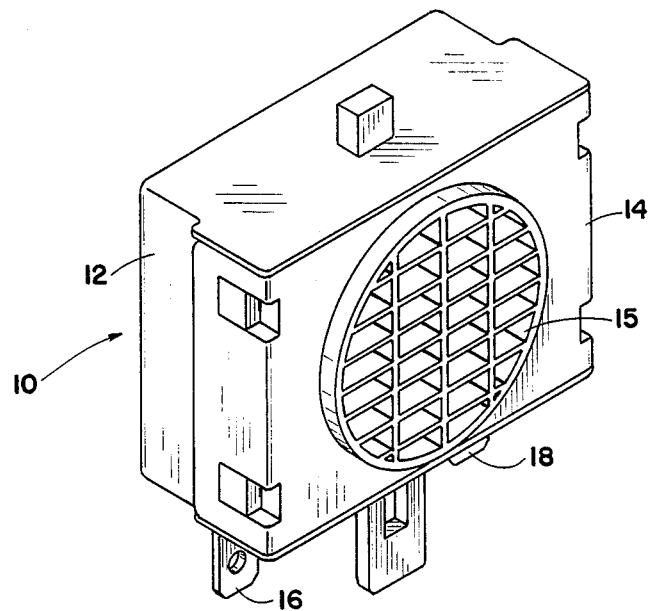
FIG. 1 is a perspective view of a plug-in type automotive seat belt warning device embodying the invention.
Figure 2:
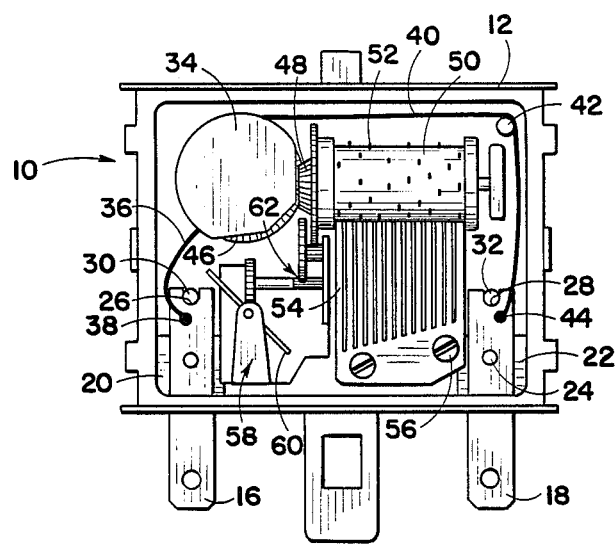
FIG. 2 is a sectional elevational view of a plug-in type automotive seat belt warning device embodying the invention.

Referring to the drawings in detail reference character 10 generally indicates a plug-in type warning device for indicating an unfastened condition in the seat belts (not shown) of an automobile upon ignition of the automobile engine. The device 10 comprises a housing 12 generally of a size and configuration corresponding to the size and configuration of the widely used buzzer type warning device (not shown) in widespread use today, and having a snap on removable cover 14 in combination therewith all as is well known. The cover 14 is preferably provided with a louvered opening 15 for cooperating with a suitable diaphragm (not shown) to provide a speaker for the device 10. A pair of spaced metallic prongs 16 and 18 are supported within the housing 12 in any suitable manner such as by a pair of bosses 20 and 22, respectively, and may be secured thereto in any well known manner such as by rivets 24. The outer end of each prong 16 and 18 extends outwardly from the housing 12 for a purpose as will be hereinafter set forth. The inner ends of the prong 16 and 18 may be provided with a central recess 26 and 28, respectively, for receiving post members 30 and 32, respectively, therein.

A small electric motor 34 is suitably mounted within the housing 12 and is electrically connected with the prongs 16 by a wire 36 passing from the motor 34, around one side of the post 30 and having the end thereof soldered or otherwise secured to the prongs 16 as shown at 38. The motor 34 is also electrically connected with the prong 18 by a wire 40 extending from the motor 34, around a post 42, around one side of the post 32 and having the end thereof soldered or otherwise secured to the prong 18 as shown at 44. A suitable beveled gear 46 is secured to the drive shaft (not shown) of the motor 34 in any well known manner for rotation thereby. The gear 46 is in a driving or meshing engagement with a complimentary beveled gear 48 which is suitably secured to one end of a rotatable drum 50 mounted within the housing in any suitable or well known manner for rotation about its own longitudinal axis. The drum 50 is preferably of the well known type commonly used in the works of a music box and is provided with a plurality of selectively circumferentially and longitudinally spaced radially outwardly extending fingers 52. The fingers 52 selectively engage the outer ends of suitable musical tines 54 which are secured within the housing in any well known manner such as by a plurality of screws 56. A governor assembly 58 is suitably mounted within the housing 12 and is provided with the usual fly wheel or governor 60 which is operably connected with the rotatable drum 50 through a suitable gear train generally indicated at 62 whereby the rotational speed of the drum may be controlled in the usual or well known manner.

In order to install the warning device 10 in lieu of the original equipment buzzer device (not shown) normally installed in the electrical system of a vehicle, the initial buzzer assembly may be unplugged from its electrical connection with the electrical system of the vehicle and the device 10 may be plugged in the socket (not shown) vacated by the initial buzzer equipment. The insertion of the prongs 16 and 18 in the socket (not shown) places the motor 34 in the electrical system of the vehicle in the same manner as the electrical contacts (not shown) of the original buzzer device. In the event the vehicle engine is started and the seat belts are unfastened electrical current will be supplied to the motor 34 for rotation of the beveled gear 46. The beveled gear 46 transmits rotation to the drum 50 through the gear 48 as the drum 50 rotates, the fingers 52 cooperate with the musical tines 54 for emitting a tune through the speaker 15. The melodious warning signals that the fastening of the seat belt or belts has been overlooked. The sound of the musical tune is much more pleasing to the ear of the operator of the vehicle than the prior or initially installed harsh buzzer sound.

Of course it will be apparent that the device 10 may be utilized for warning or signalling of substantially any abnormal operating condition in the vehicle as desired. It will also be apparent that an electronic music producing means may be utilized in lieu of the drum and musical tines, or suitable means for producing a voice signal in lieu of a musical signal may be utilized in order to provide a more pleasant reminder of the abnormal condition existing in the vehicle.

From the foregoing it will be apparent that the present invention provides a novel plug-in type warning device providing a pleasant warning or signal of unfastened seat belts or the like in an automobile or other vehicle. The normal initially installed harsh sounding buzzer providing the warning signal for these abnormalities may be removed by unplugging the initially installed apparatus and may be replaced by simply plugging in the novel warning device of the present invention in the socket vacated by the removed original equipment warning device.

Whereas the present invention has been described in particular relation to the drawings attached hereto, it should be understood that other and further modifications, apart from those shown or suggested herein may be made within the spirit and scope of this invention.

What is claimed is:

1. A plug-in warning device for replacing an originally installed electrically actuated buzzer for signalling an abnormal operating condition, said plug-in warning device comprising a housing generally corresponding to the size and configuration of the original buzzer, removable cover means secured on the housing and providing a speaker for the plug-in warning device, prong means secured within the housing and having the outer ends thereof extending outwardly from the housing for being connected with the electrical actuator of the buzzer, electric motor means mounted in the housing and electrically connected with the prong means, audible means operably connected with the electric motor means for actuation thereby to produce a pleasing warning signal of said abnormal operating condition, the audible means comprising musical means producing a tune for said signal, the musical means comprising a rotatable drum mounted in said housing and operably connected with the electric motor means for rotation about its own longitudinal axis, and musical tine means secured in the housing in the proximity of the drum for selective engagement thereby to produce said tune.

2. A plug-in warning device as set forth in claim 1 wherein outwardly extending spaced fingers are provided on the outer periphery of the drum for selective engagement with the musical tines to produce said tune.

3. A plug-in warning device as set forth in claim 2 and including governor means mounted within the housing and operably connected to the drum for controlling the speed of rotation thereof.

* * * * *